(12) United States Patent
Igarashi et al.

(10) Patent No.: US 8,813,899 B2
(45) Date of Patent: Aug. 26, 2014

(54) DAMPER AND VEHICLE SEAT

(75) Inventors: Yoshiteru Igarashi, Fujisawa (JP); Akihiko Okimura, Fujisawa (JP)

(73) Assignee: Oiles Corporation, Tokyo (JP)

( * ) Notice: Subject to any disclaimer, the term of this patent is extended or adjusted under 35 U.S.C. 154(b) by 113 days.

(21) Appl. No.: 13/236,560

(22) Filed: Sep. 19, 2011

(65) Prior Publication Data
US 2012/0018934 A1  Jan. 26, 2012

Related U.S. Application Data

(62) Division of application No. 12/444,534, filed as application No. PCT/JP2007/001132 on Oct. 18, 2007, now Pat. No. 8,210,608.

(30) Foreign Application Priority Data

Oct. 20, 2006  (JP) .................................. 2006-285879

(51) Int. Cl.
*F16D 57/00*  (2006.01)
*B60N 2/42*  (2006.01)
*B60N 2/427*  (2006.01)
*B60N 2/48*  (2006.01)
*F16F 9/14*  (2006.01)

(52) U.S. Cl.
CPC .......... B60N 2/4885 (2013.01); B60N 2/42781 (2013.01); F16F 9/145 (2013.01)
USPC ....................... 180/290; 297/216.12

(58) Field of Classification Search
CPC ...... F16F 9/145; F16F 2232/02; B60N 2/427; B60N 2/48; B60N 2/2851
USPC ............ 188/290, 293–295, 306; 297/216.12, 297/408, 409; 267/121, 124
See application file for complete search history.

(56) References Cited

U.S. PATENT DOCUMENTS

| 3,680,912 | A | 8/1972 | Matsuura | |
|---|---|---|---|---|
| 7,188,894 | B2 | 3/2007 | Humer et al. | |
| 8,029,055 | B2 | 10/2011 | Hartlaub | |
| 2004/0099495 | A1* | 5/2004 | Hayashi | 188/290 |
| 2009/0151121 | A1* | 6/2009 | Lin | 16/321 |
| 2009/0266660 | A1* | 10/2009 | Saito et al. | 188/290 |

FOREIGN PATENT DOCUMENTS

| JP | H2-16839 U | 2/1990 |
|---|---|---|
| JP | H06-33966 A | 2/1994 |
| JP | 10-6919 | 1/1998 |
| JP | 10-181403 | 7/1998 |
| JP | 10-311359 | 11/1998 |
| JP | 10-331895 | 12/1998 |
| JP | 2003-267108 | 9/2003 |

* cited by examiner

*Primary Examiner* — Vishal Sahni
(74) *Attorney, Agent, or Firm* — patenttm.us

(57) ABSTRACT

A damper is provided which damps an applied external force in accordance with the strength of the external force (impact strength). The damper 10 comprises a vessel 20 having a cylindrical chamber 21 filled with a viscous fluid, a turn member 60 turned by the external force, a slider member 40 which is moved in the chamber 21 of the vessel 20 by turn of the turn member 60, partition member 80 engaged with the slider member 40, a coiled spring 100 for energizing the slider member 40 toward the turn member 60, and a resin cap 100 blocking an opening of the vessel 20.

4 Claims, 9 Drawing Sheets

Fig. 7
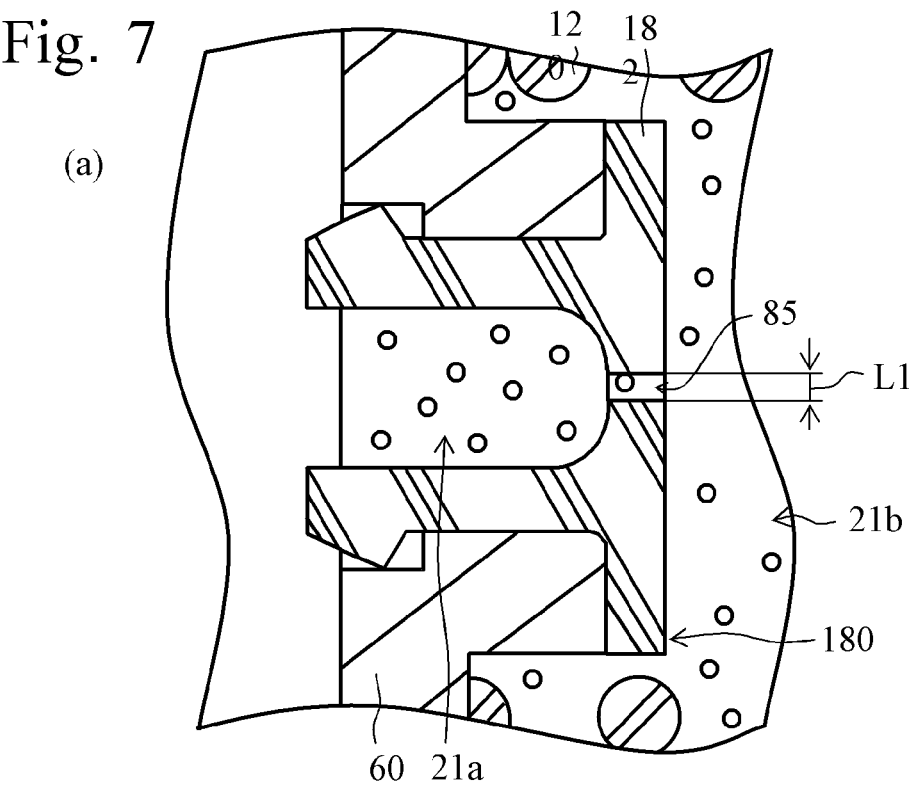
(a)
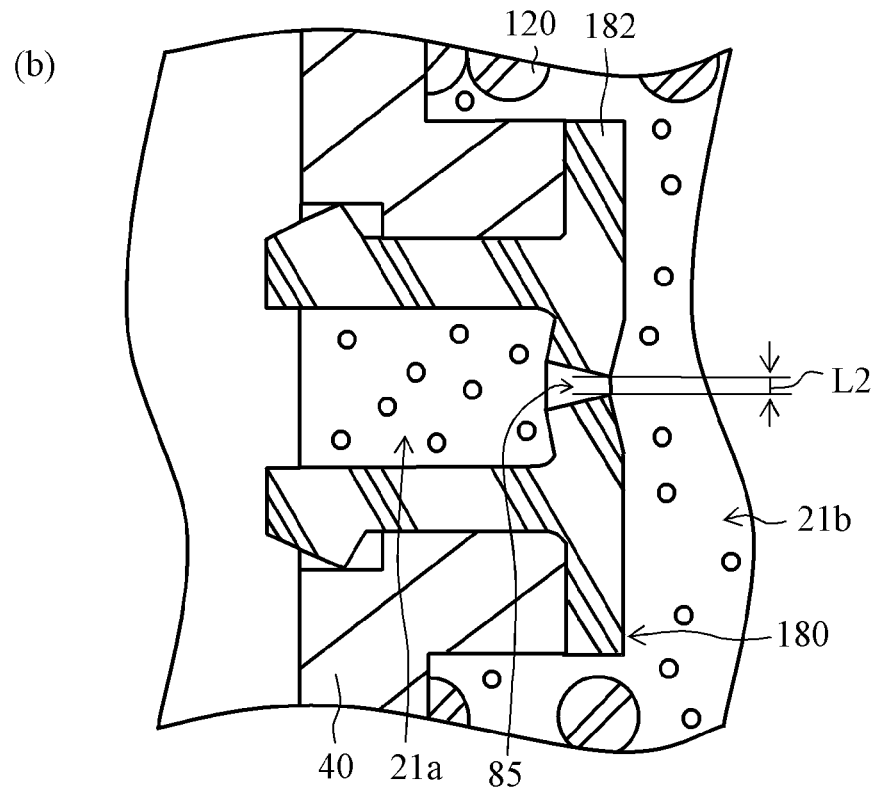
(b)

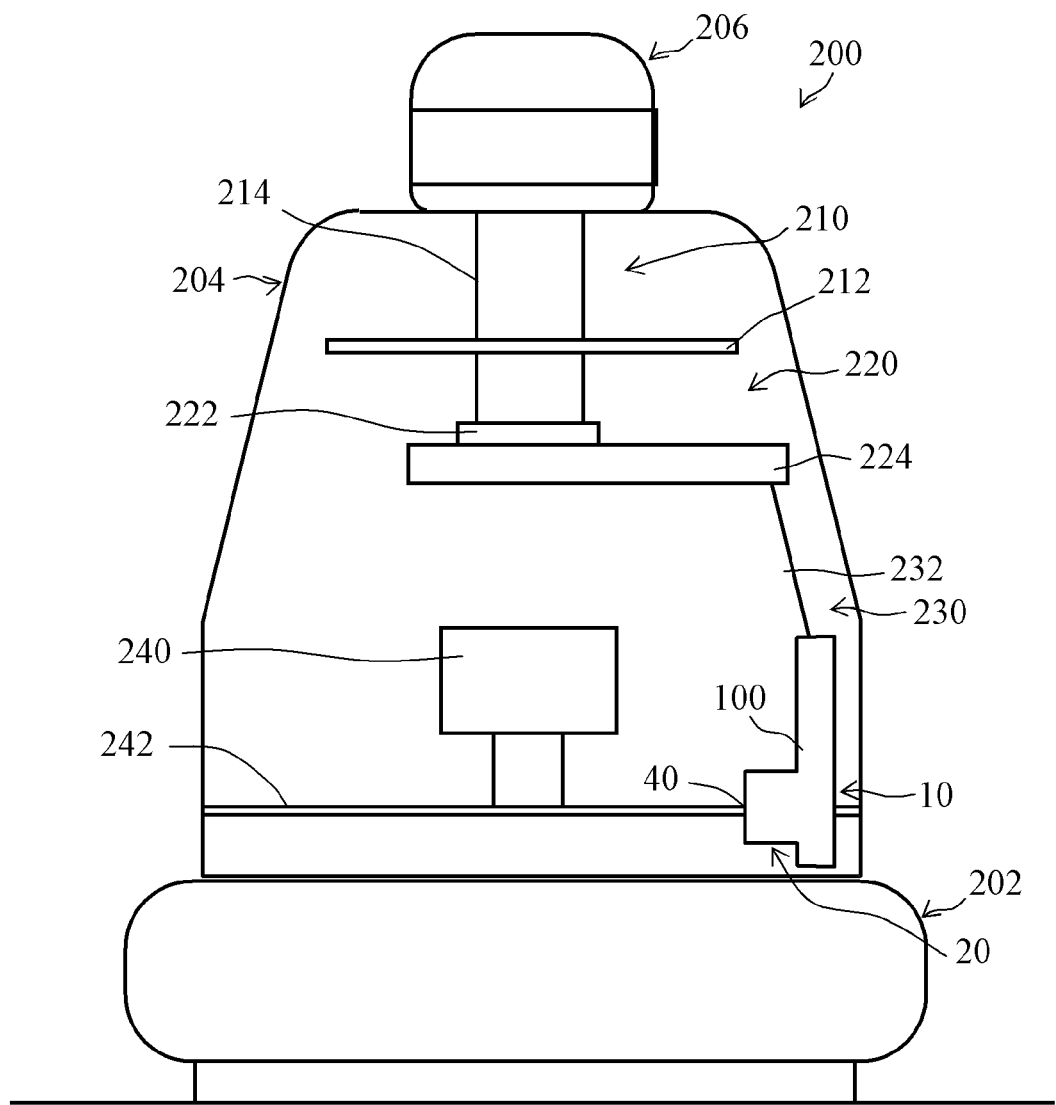

DAMPER AND VEHICLE SEAT

CROSS-REFERENCE TO RELATED APPLICATIONS

This application is a division of U.S. patent application Ser. No. 12/444,534, filed Apr. 6, 2009.

TECHNICAL FIELD

The present invention relates to a damper for reducing an impact or attenuating a vibration or movement, relating for example to a damper suitable for damping movement of a turning body, and a vehicle seat incorporating this damper.

BACKGROUND TECHNIQUE

Dampers (shock absorbers or vibration attenuators) are widely used in machines and apparatuses to reduce an impact or attenuate a vibration or a movement. Generally, the damper utilizes elasticity or viscosity of a rubber, a spring, air, or oil contained in the damper for absorbing the kinetic energy of the impact. For strengthening the power for kinetic energy absorption (damping power), usually the rubber contained is increased or the spring contained is made larger. Therefore the powerful damper is necessarily larger in size.

In vehicles, a headrest is installed on the vehicle seat to protect a sitting person from an accidental impact. The headrest is designed to move forward on a rear end collision to protect the head of the sitting person. (See for example Patent Documents 1 and 2.) Such a constitution is complicated and costly.

(Patent Document 1) Japanese Patent Application Laid-Open No. Hei-10-181403
(Patent Document 2) Japanese Patent Application Laid-Open No. Hei-10-006919

DISCLOSURE OF INVENTION

Problem to Be Solved by the Invention

The installation of the above-mentioned damper on a vehicle seat is considered which is movable forward by an action of an impact from the vehicle rear side.

In the constitution in which the above damper is incorporated into a vehicle seat to be movable forward by action of an impact, the headrest can be moved forward by a slight external force such as hand-pushing force applied to the vehicle seat. That is, even a slight impact other than the accidental impact can move the headrest forward. On the other hand, in the constitution in which the headrest will not be moved by a weak external force like hand-pushing, the headrest may not be moved by an accidental impact.

In view of the above matters, the present invention intends to provide a damper having a damping force variable in correspondence with the strength of an external force (impact strength) applied, and to provide a vehicle seat incorporating the damper.

Means for Solving Problem

For achieving the above object, the damper of the present invention for damping an external force comprises:
(1) a vessel having a cylindrical chamber therein;
(2) a slider member placed in the chamber and dividing the chamber into two small rooms and movable in the cylindrical chamber;
(3) a turn member placed in one of the two small rooms, turned by the external force, and converting the turning force into a driving force of the slider member;
(4) a viscous fluid filled in the chamber;
(5) a partition member engaged with the slider member and having a communication path for flow of the viscous fluid between the two small rooms;
(6) a coiled spring for energizing the slider member toward the turn member; and
(7) a cap fixed to the vessel by engaging with the slider member and blocking an opening at one end of the vessel.
(8) The partition member may have an orifice as the communication path.
(9) The slider member may have a cylindrical boss having at the end face thereof a groove serving as the communication path.
(10) The turn member may have a circular cylindrical slope portion having slope faces.
(11) The slider member may have a circular cylindrical slope portion having slope faces for engaging with the slope faces of the turn member.
(12) The slider member may be constituted to move in the cylindrical chamber by turning the turn member engaging the slope faces of the turn member with the slope faces of the slider member.
(13) The slider member may have plural curved plates rising along the perimeter at even intervals on the face confronting the cap; and
(14) the cap may have plural curved plates rising along the perimeter at even intervals on one of the face thereof; and
(15) the curved plates of the slider member may be inserted into the intervals of the curved plates of the cap to engage the slider member with the cap at the periphery direction.

The vehicle seat of the present invention, for achieving the above object, which has a headrest placed at the top of a backrest to be in contact with the back of a riding person for protecting a head of the riding person, and an energizing mechanism for energizing the headrest to move toward the front side of the vehicle, and a stopping mechanism to stop the energizing of the energizing mechanism not to cause movement of the headrest toward the front side of the vehicle, comprises:
(16) the damper set forth in any of the above items (1) to (15), placed in the backrest;
(17) in the damper, when the turn member is turned by an external force applied to the turn member at a turning rate less than a predetermined rate, the slider member is moved in the cylindrical room of a vessel by turn of the turn member, and the external force is attenuated by throttle resistance caused by the flow of the viscous fluid through the communication path; and when the turn member is turned by an external force applied to the turn member at a turning rate more than the predetermined rate, the turn member and the slider member are rigid-coupled and the slider member and the cap are turned together with the vessel; and comprises further
(18) an external force receiving pad which is placed inside the backrest and turns the turn member of the damper on receiving the external force given to the backrest; and
(19) a releasing mechanism which releases the stopping of the stopping mechanism to start the energizing mechanism in accordance with the turn of the vessel and the cap fixed to the vessel.
(20) The releasing mechanism may work only when the turn member of the damper is turned at a turning rate higher than a predetermined rate.

Effect of Invention

The damper of the present invention is capable of damping an external force by utilizing a throttle resistance of a viscous fluid at a communication channel when a turn member is turned by an external force (turning force) applied to the turn member at a turning rate less than a predetermined rate. When this damper is turned by an external force (turning force) applied to the turn member at a turning rate more than a predetermined rate, the throttle resistance of the viscous fluid at the communication path becomes extremely higher to cause rigid coupling between the turn member and a slider member. Thereby the slider member is turned together with the cap and the vessel. The vehicle seat incorporating this damper is capable of distinguishing precisely a rear-end collision impact from other external forces. Therefore only at the rear end collision, a stopping mechanism is released to turn the cap of the damper and to activate the energizing mechanism to move the headrest surely forward.

BRIEF DESCRIPTION OF THE DRAWINGS

FIG. 7A is a sectional view of the partition member which is not deformed elastically. FIG. 7B is a sectional view of the partition member which is deformed elastically.

FIG. 9 is a front view of the vehicle seat illustrated in FIG. 9.

BEST MODE FOR CARRYING OUT THE INVENTION

Examples of carrying out the present invention are described below in detail with reference to drawings without limiting the present invention in any way.

EXAMPLES

Figure 1:
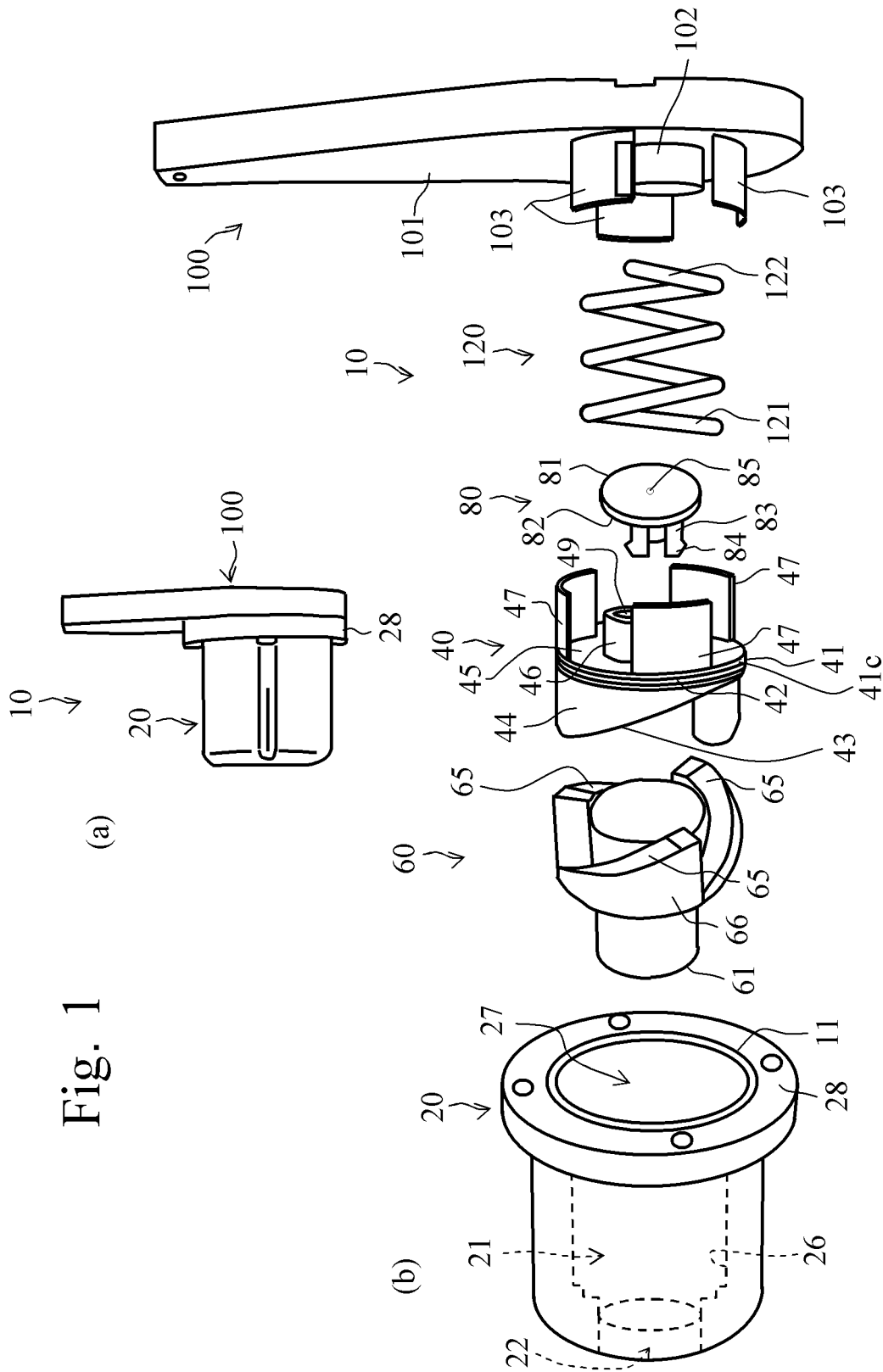
FIG. 1A is a perspective view of a damper.
FIG. 1B is an exploded view of the damper in FIG. 1A, illustrating the constituting members.
Figure 2:
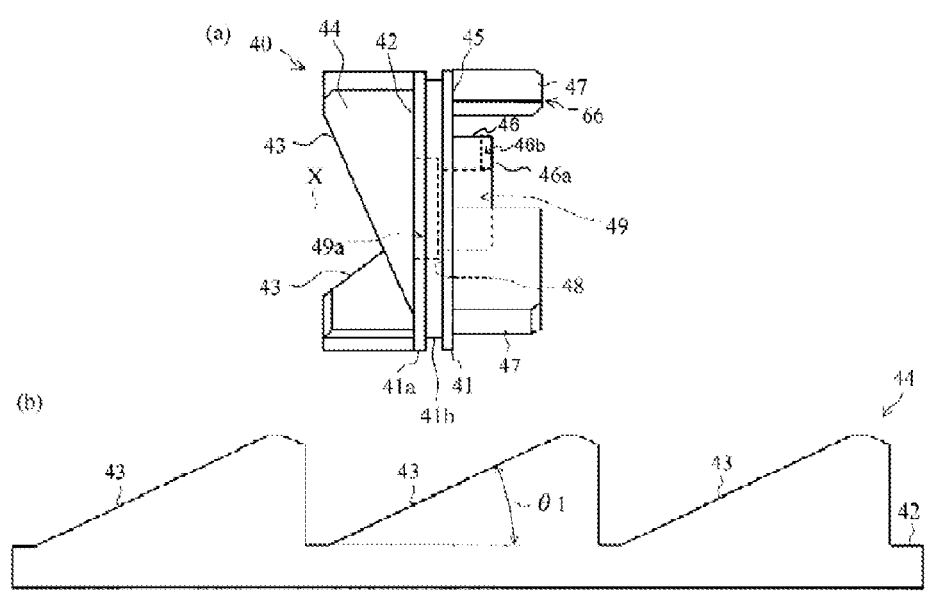
FIG. 2A is a side view of the slider member.
FIG. 2B is a development view of the slope portion of the slider member.
Figure 3:
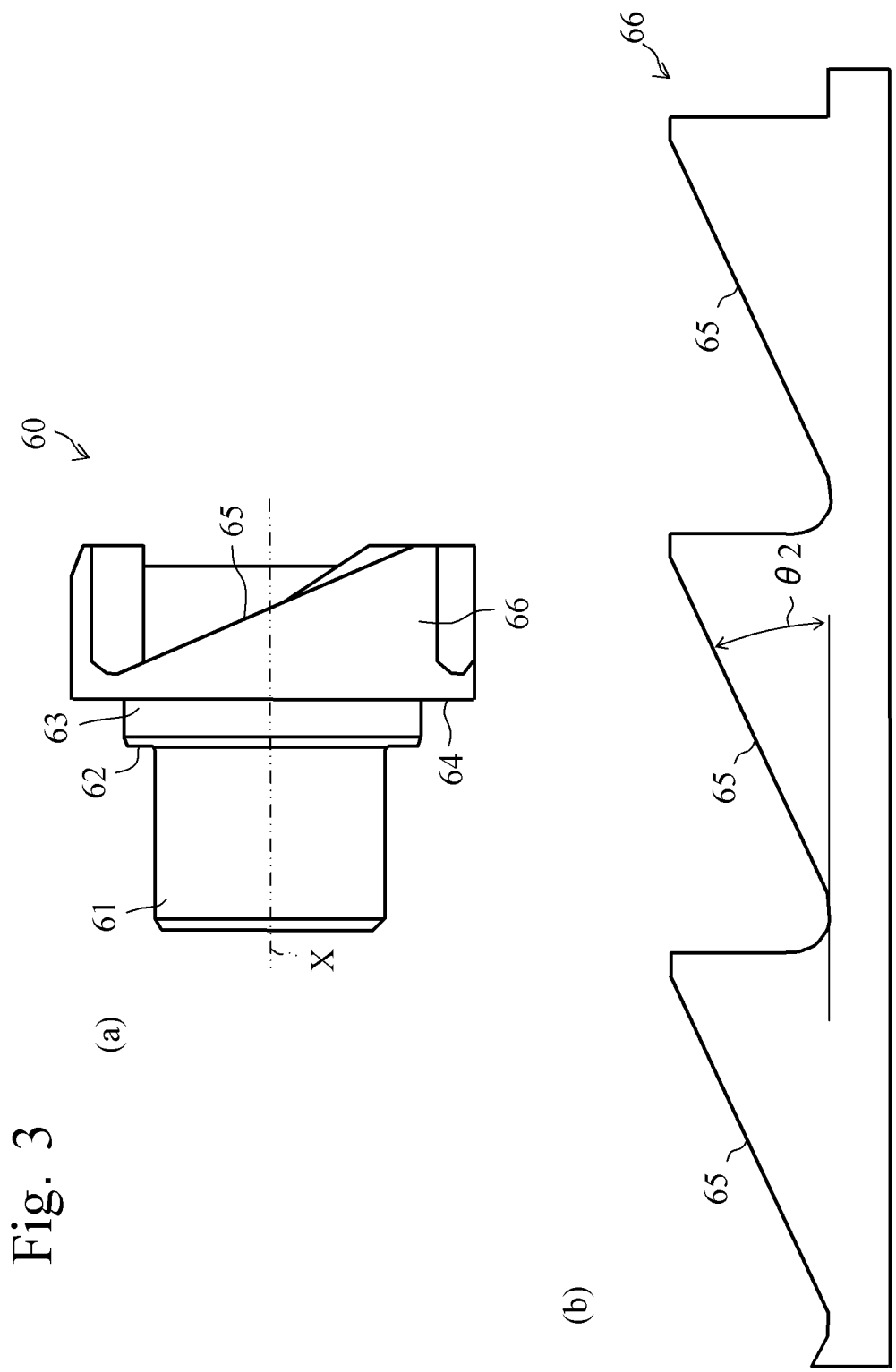
FIG. 3A is a side view of the turn member.
FIG. 3B is a development view of the slope portion of the turn member.

An example of the damper of the present invention is described with reference to FIGS. 1-3.

FIG. 1A is a schematic perspective view of an example of the damper. FIG. 1B is an exploded view of the damper of FIG. 1A, illustrating the constituting members. FIG. 2A is a side view of a slider member; FIG. 2B is a development view of the circular cylindrical slope portion of the slider member. FIG. 3A is a side view of the turn member. FIG. 3B is a development view of the circular cylindrical slope portion of the turn member.

Figure 4:
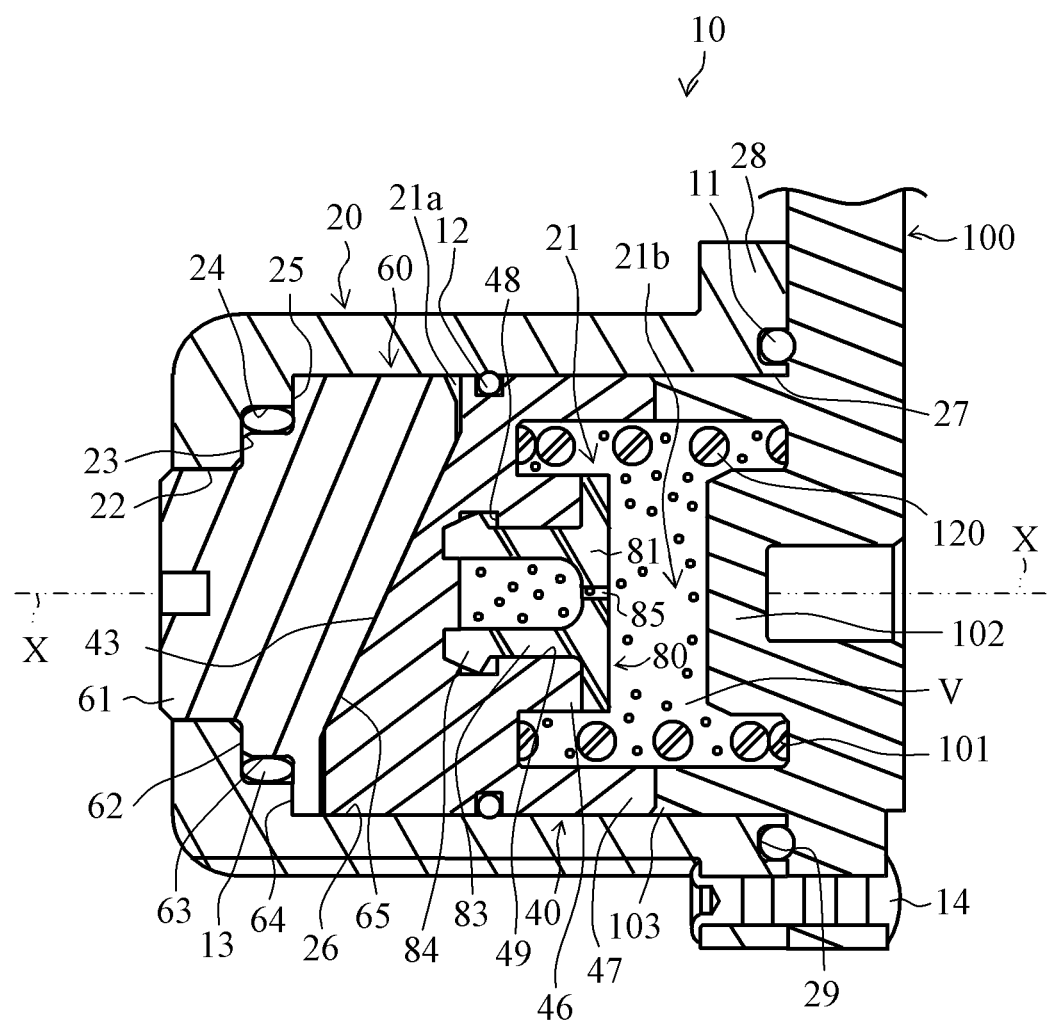
FIG. 4 is a simplified sectional view of the damper which is not affected by an external force.

The damper 10 comprises a resin vessel 20, a slider member 40, a turn member 60, a viscous fluid V, a partition member 80, a coiled spring 120, and a resin cap 100. The resin vessel 20 has a cylindrical chamber 21 as illustrated in FIG. 1B. The slider member 40 made of a resin is placed inside the chamber 21 to divide the chamber 21 into two small rooms 21a, 21b (FIG. 4). The turn member 60 made of a resin is placed in the one room 21a of the small rooms 21a, 21b. The viscous fluid V is filled in the chamber 21. A partition member 80 made of a resin has an orifice hole 85 as a communication path for flow of the viscous fluid V between the small rooms 21a, 21b. The coiled spring 120 energizes the slider member 40 toward the turn member 60. The cap 100 made of a resin closes an opening 27 at one end of the vessel 20 and is fixed to the vessel 20.

The vessel 20 having a cylindrical chamber 21 in the inside thereof has an opening 22 at another end thereof. The opening 22 is connected through an annular shoulder 23 (FIG. 4) to a cylindrical face 24 (FIG. 4) having a larger diameter and further connected through the cylindrical face 24 and a circular shoulder 25 to the inside peripheral face 26 having a larger diameter in the vessel 20. The vessel 20 has a larger opening 27 on the one end opposite to the opening 22 of the vessel 20. On the outside periphery of the opening 27, a flange 28 is formed for fixing the cap 100 to the vessel 20. On the end face of the inside periphery of the opening 27, an annular groove 29 is formed to surround the opening 27. An O-ring 11 made of a rubber elastomer is fitted into the annular groove 29. In the examples, the vessel 20 is shown to be cylindrical in appearance, but the appearance and the shape of the vessel 20 is not limited thereto, but may be in a shape of a prismatic column including a triangular prism shape and a quadrangular prism shape.

The slider member 40 has a disk-shaped main body 41 and circular cylindrical slope portion 44 (three slopes in Example) rising at the perimeter of one end face 42 of the main body 41 as illustrated in FIGS. 1B, 2A, and 2B. The circular cylindrical slope portion 44 has slope faces 43 rising from the end face 42 toward the end of the circular cylindrical slope portion 44. The slope face 43 is slanted, in Examples as illustrated in FIG. 2B, by a slope angle θ1 of 25°. The slider member 40 has a cylindrical boss 46 protruding from the center of another end face 45 toward the opening 27. On the outside periphery of the end face 45, curved plates 47 (three plates in Example) rise at even intervals along the perimeter. The slider member 40 has a round hole 49 extending from circular one end face 46a of the cylindrical boss 46 through annular step 48 and a round hole 49a having increased diameter to the one end face 42.

The body 41 of the slider member 40 has an annular groove 41b along the peripheral face 41a. An O-ring made of a rubber elastomer is fitted to the annular groove 41. The slider member 40 is placed in the cylindrical chamber 21 of the vessel 20 slidably in contact with the inside peripheral face 26 and movable in the chamber 21 to separate the chamber 21 into two small rooms 21a, 21b.

The turn member 60 has, as illustrated in FIG. 1B and FIGS. 3A and 3B, a cylindrical shaft 61, a column 63 having a larger diameter with interposition of an annular shoulder portion 62 continuous with the cylindrical shaft 61, and a circular cylindrical slope portion 66 having plural slopes (three slopes in Example) having a larger diameter with interposition of an annular shoulder portion 64 continuous to the column 63. The cylindrical slope portion 66 has a cut slope face 65 having a slope ascending from near the annular shoulder 64 toward the end of the cylindrical slope portion 66, the slope face 65 being slanted at a slope angle θ2 similar to the slope angle θ1 of the slope face 43 of 25° as illustrated in FIG. 3b.

The turn member 60 has the shaft 61 inserted into the opening 22 of the vessel 20, and the annular shoulder portion 62 is brought into contact slidably with the annular shoulder 23 of the vessel 20, and annular shoulder 64 is brought into contact slidably with the annular shoulder 25 of the vessel 20, and the outside peripheral face of the circular cylindrical slope portion 66 is brought into contact slidably with the inside peripheral face 26 of the vessel 20. Thereby the turn member is placed in one small room 21a of the small rooms divided by the slider member 40. Between the outside peripheral face of the column 63 and the inside peripheral face of the cylindrical face 24 of the vessel 20 corresponding thereto, a seal ring 13 made of a rubber elastomer is fitted.

The turn member 60 is engaged with the slider member 40 by contact of the cut slope face 65 of the cylindrical slope portion 66 with the slope face 43 of the cylindrical slope portion 44. The slider member 40 is moved within the chamber 21 along the inside peripheral face 26 of the vessel 20 with counterclockwise turning of the turn member 60 (counterclockwise viewed from the opening 22 in FIG. 1B).

The partition member 80 is constituted of a disk-shaped main body 81, plural legs 83 (three legs in Example) projecting from one end face 82 of the main body 81, and engaging-enlarged tips 84 formed on peripheral face of the ends of the legs 83, and a fine orifice hole 85 is formed through the center of the main body 81 as a communication path.

For engaging the partition member 80 with the slider member 40, the legs 83 are inserted into the round hole 49 opened at the end face 46a of cylindrical boss 46 of the slider member 40, and the engaging-enlarged tips 84 of the legs 83 are brought into contact slidably with the inside peripheral face of the round hole 49a having increased diameter of the round hole 49. Thereby, the partition member 80 is fitted to the cylindrical boss 46 of the slider member 40 to close the opening of the round hole 49. The partition member 80 is thereby fixed by the engaging-enlarged tips 84 to the annular step 48 not to get out of the round hole 49.

A resin-made cap 100, which closes the opening 27 of the vessel 20, has on one end face 101 a cylindrical boss 102 projecting from the one end face 101, and plural curved plates 103 (three plates in Example) rising at even intervals along the perimeter surrounding the cylindrical boss 102.

The cap 100 is integrated with the vessel 20 by inserting the curved plates 103 into the inside peripheral face 26 of the vessel 20 to close the opening 27 of the vessel 20 and by pressure contact with an O-ring 11 placed in a annular groove 29 on the end face of the periphery of the opening 27 of the vessel 20 and by a fixing means like screws 14. The curved plates 103 inserted into the inside peripheral face 26 of the vessel 20 has the end portions placed at the interspaces of the three curved plates 47 of the slider member 40. Thereby the slider member 40 and the cap 100 are engaged together at the periphery by the curved plates 103 and the curved plates 47.

One end 121 of the coiled spring 120 is placed in the space defined by the outside peripheral face of the cylindrical boss 46 of the slider member 40 and the inside peripheral face of the cylindrical curved plates 47 and is brought into contact with the end face 45 of the slider member 40. Another end 122 of the coiled spring 120 is placed in the space defined by the cylindrical boss 102 projecting from an end face 101 of the cap 100 and the inside peripheral face of the cylindrical curved plates 103 surrounding the cylindrical boss 102, and is brought into contact with the end face 101 of the cap 100. Thereby the coiled spring is held in the vessel 20.

A viscous fluid V is filled as a resisting force generating material into the chamber 21 in the vessel 20. A preferred viscous fluid is a silicone oil having a viscosity ranging from 100 to 1000 cst.

The function of the damper 10 is described below with reference to FIGS. 4, 5, and 6.

As illustrated in FIG. 4, the turn member 60 and the slider member 40 are engaged with each other through the slope faces 55, 43 of the circular cylindrical slope portions 66, 44.

The slider member 40 is energized by the coiled spring 120 toward the turn member 60. In this state, when a counterclockwise external force (turning force) is applied in a counterclockwise direction to the turn member 60, the slider member 40 is driven straightly toward the cap 100 with turning of the turn member 60 against the energizing force of the coiled spring 120. When the external force applied to the turn member 60 is weaker than a predetermined strength (the turning force being within a range for the predetermined turning rate), the slider member 40 is moved in the chamber 21, and the viscous fluid V filled in the small room 21b in the vessel 20 is allowed to flow through the orifice hole 85 of the partition member 80 into the small room 21a. As the result, the viscous fluid V produces a throttle resistance at the orifice hole 85 to attenuate the external force applied to the turn member 60. The slider member 40 can be moved maximally to the position illustrated in FIG. 5.

On the other hand, in the state as illustrated in FIG. 4, when an external force (turning force) is applied suddenly in the counterclockwise direction to the turn member 60 at a rate higher than a predetermined range, the slider member 40 is energized to move within the chamber 21 against the force of the coiled spring 120. However, the viscous fluid V filled in the small room 21b produces a large throttle resistance force at the orifice hole 85 of the partition member 80 to cause rigid coupling between the turn member 60 and the slider member 40. Owing to this rigid coupling, the turning force applied to the turn member 60 turns the rigid coupled slider member 40, and turns the cap 100 engaged with the curved plates 47 of the slider member 40 at the curved plates 103 and turns also the vessel 20 fixed to the cap 100.

Figure 5:
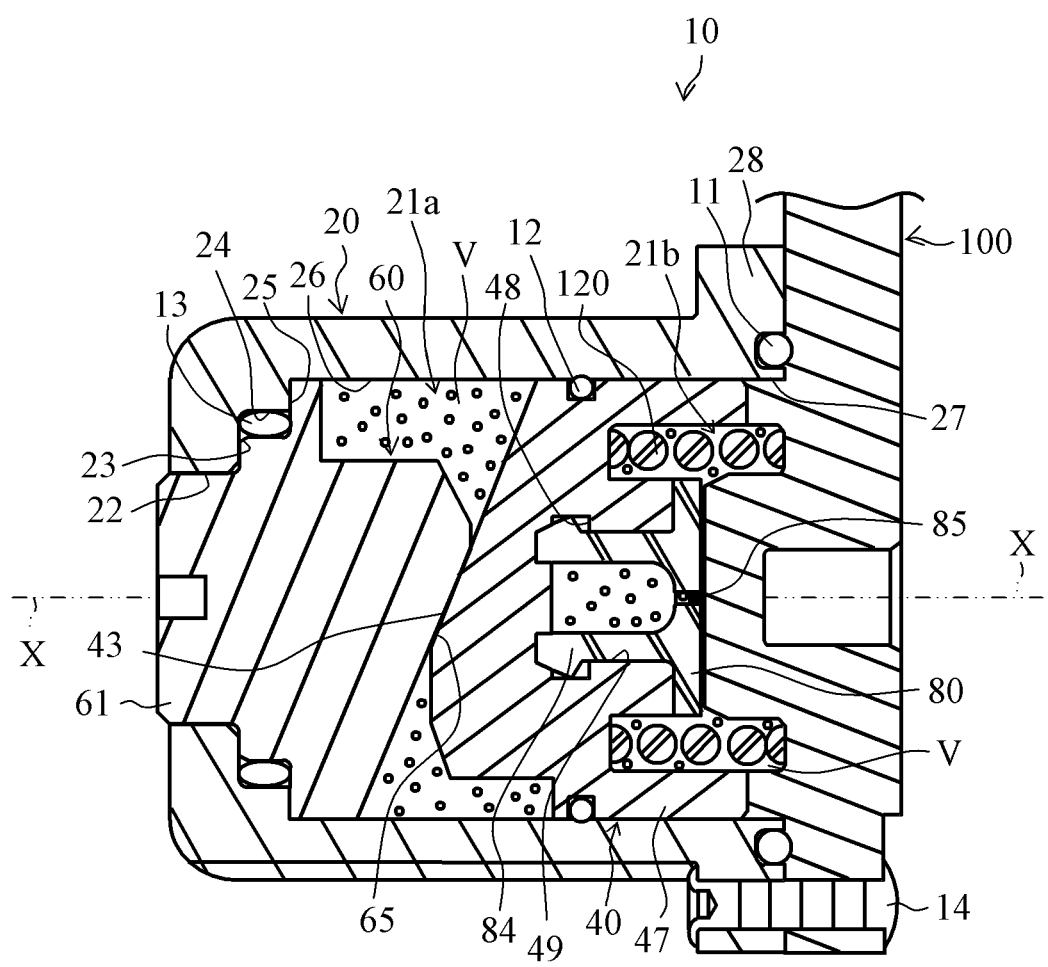
FIG. 5 is a simplified sectional view of the damper in which the slider member is displaced maximally by an external force.
Figure 6:
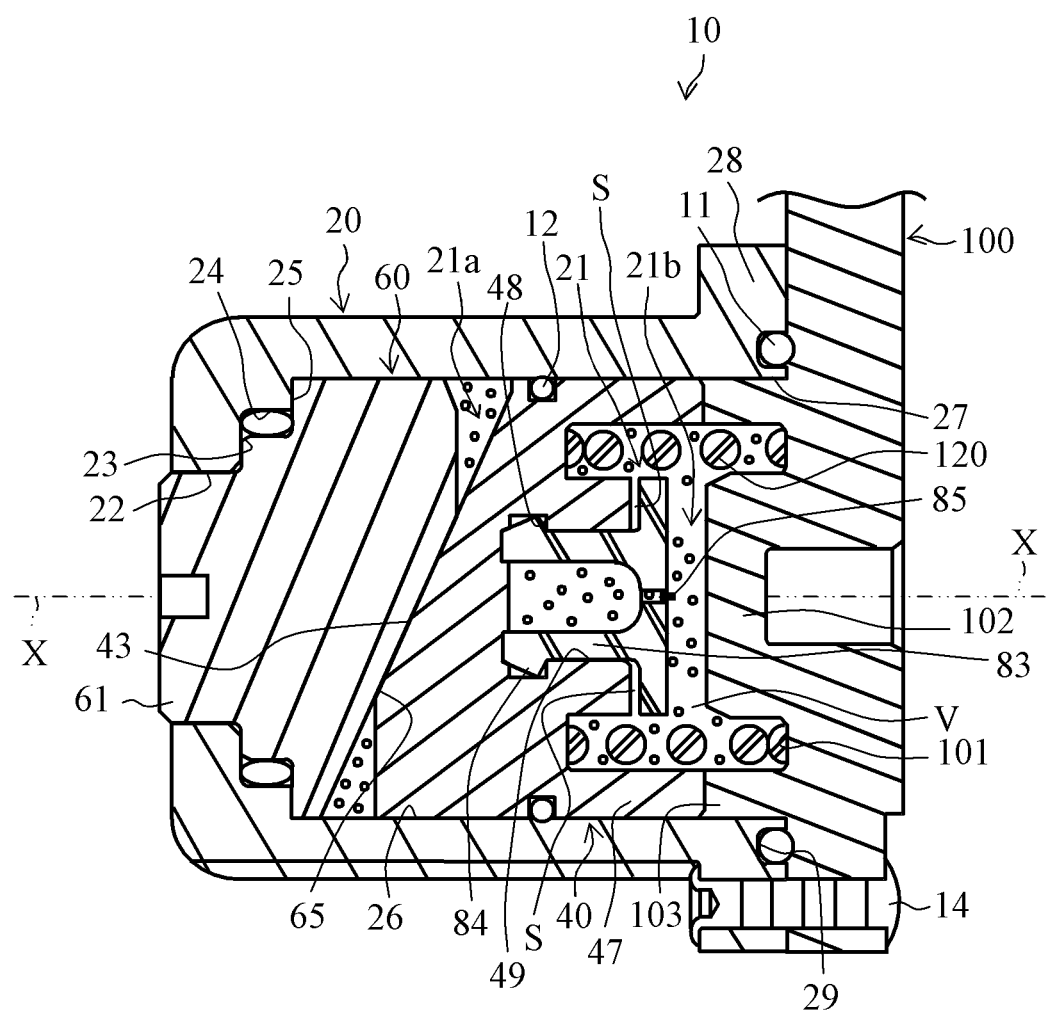
FIG. 6 is a sectional view illustrating the movement in the damper on releasing the external force.

With the damper 10 in the state illustrated in FIG. 5, when the external force applied to the turn member 60 is released, because the slope face 43 of the slider member 40 constantly slides engaged with the slope face 65 of the turn member 60, the slider member 40 is driven by the spring force (energizing force) of the coiled spring 120 toward the direction in such a manner as that the slope face 43 of the slider member 40 comes into contact with the slope face 65 of the turn member 60 at a larger area (as illustrated in FIG. 6). The movement of the slider member produces a pressure in the viscous fluid V in the small room 21a to slide the partition member 80. By this movement of the partition member 80, the main body 81 of the partition member 80 closing the opening of the round hole 49 is also moved to open the round hole 49. Thereby the viscous fluid V is forced to flow through the opened round hole 49 and the gap S to the small room 21b to release the pressure in the small room 21a. Thereby the slider member 40 is driven further toward the turn member 60 and the slope face 43 of the slider member 40 engages with the slope face 63 of the turn member 60 at a further larger area and turns the turn member 60 to restore the relative position of the turn member 60 and the slider member 40 (as illustrated in FIG. 4). Incidentally, the engaging-enlarged tips 84 for the engagement formed on the outside ends of the legs 83 are engaged to the annular step portion 48 to keep the partition member 80 not to get out of the round hole 49 of he slider member 40.

In the above-mentioned damper 10, the resistance force is generated by the flow of the viscous fluid V filled in the small room 21a and the small room 21b through the orifice hole 85 of the partition member 80. In another type of the damper, in place of the orifice hole 85, a groove 46b is formed at the end face 46a of the cylindrical boss 46 of the slider member 40 in contact with the end face 82 of the main body 81 of the partition member 80 to allow the viscous fluid V to flow through this groove between the small room 21a and the small room 21b.

An example of the partition member 80 made from an elastomer is described with reference to FIG. 7.

FIG. 7A illustrates a cross-section of a partition member not deformed elastically, and FIG. 7B illustrates a cross-section of the partition member deformed elastically.

The partition member 80 mentioned above, which is made of a resin, is hardly deformed elastically by the resistance to the flow of the viscous fluid V through the orifice hole 85. On the other hand, the partition member 180 in FIGS. 7A and 7B is made of an elastomer (e.g., rubber), and is readily deformable by the aforementioned flow resistance. The partition member 180 made of an elastomer is kept undeformed as illustrated in FIG. 7A when the resistance force is not produced by the flow of the viscous fluid V through the orifice hole 85. The diameter of the orifice hole 85 in this undeformed state is defined to be L1. However, when a resistance force is produced to retard the flow of the viscous fluid V at the orifice hole 85, the partition member 180 is deformed elastically corresponding to the resistance force as illustrated in FIG. 7B. FIG. 7B illustrates a state in which the viscous fluid V flows from the small room 21b into the small room 21a (transition of the state from FIG. 4 to FIG. 5). In this state the minimum diameter of the orifice hole 85 is L2 (L1>L2). The greater the resistance, the smaller is L2. That is, the greater the resistance (the higher the velocity of the external force acting on the turn member 60), the smaller is the minimum of the diameter L2 to retard the turn of the turn member 60, whereby a damper of load-sensitive type is obtained.

Next, a vehicle seat incorporating the above damper 10 is described with reference to FIGS. 8 and 9.

Figure 8:
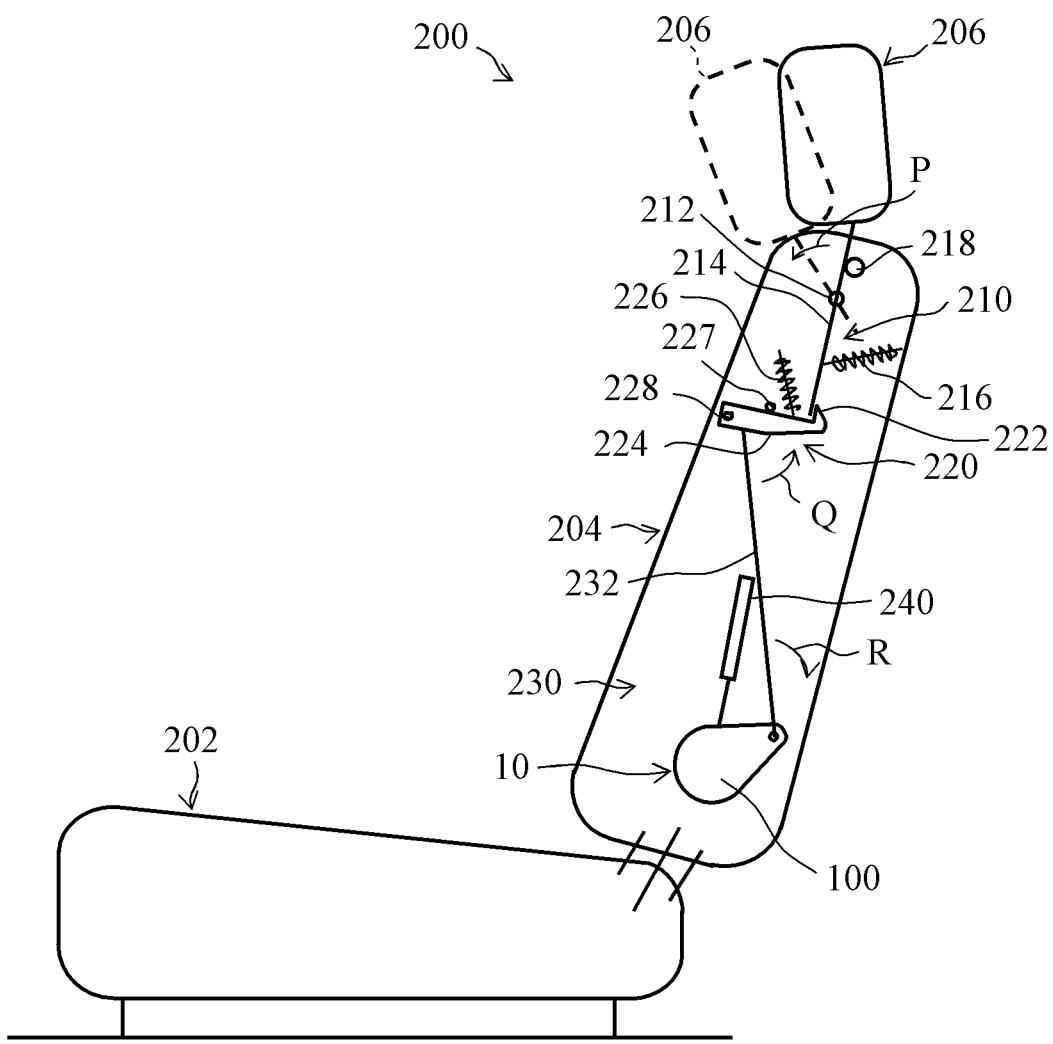
FIG. 8 is a schematic side view of a vehicle seat incorporating the damper illustrated in FIG. 1 and other drawings.

FIG. 8 is a schematic side view of a vehicle seat 200 incorporating a damper 10. FIG. 9 is a schematic front view of the vehicle seat 200 illustrated in FIG. 8.

The vehicle seat 200 contains seat cushion 202 for sitting of a riding person, a backrest 204 to be in contact with the back of the riding person, and a headrest 206 for protecting the head of the riding person. The backrest 204 contains inside an energizing mechanism 210 for energizing the headrest 206 to move forward; a stopping mechanism 220 for stopping the energization by the energizing mechanism 210 not to cause the forward movement of the headrest 206; and a releasing mechanism 230 for releasing the stopping action of the stopping mechanism 220 to actuate the energizing mechanism 210. The backrest 204 contains further, in the lower part thereof, the aforementioned damper 10, and an external force receiving pad 240 which allows the turn member 60 of the damper 10 to turn by receiving an external force.

The energizing mechanism 210 has a center shaft 212 extending in the vehicle width direction and an energizing plate 214 extending in the vehicle height direction at the upper portion of the backrest 204. The energizing plate 214 is fixed at the top end to the headrest 206, and is fixed to be turnable at the middle in the vehicle height direction to the center shaft 212. At the lower portion than the center shaft 212 of the energizing plate 214, an end of a coiled spring 216 is hooked which energizes to turn the energizing plate 214 around the center shaft 212 in the arrow P direction. Another end of the coiled spring 216 is fixed to the rear side of the backrest 204. At the upper portion than the center shaft 212 of the energizing plate 214, a stopper 218 is placed to prevent turn of the energizing plate 214 in the direction reverse to the arrow P beyond the position indicated in FIG. 8. Thus the headrest 206 is constantly energized by the energizing mechanism 210 to move toward the front of the vehicle (to move to the position indicated by the broken line in FIG. 8). However, without impact to the vehicle, the energization by the energizing mechanism 210 is stopped by the stopping mechanism 220.

The stopping mechanism 220 has a stopping plate 224 having a projection 222 for hooking the bottom end of the energizing plate 214, and a coiled spring 226 for energizing the stopping plate 224 toward the arrow Q direction. The stopping plate 224 spreads nearly parallel to the seat cushion 202 and the coiled spring 226 is placed higher than the stopping plate 224. The stopping plate 224 has the projection 222 at the rear end portion, and is fixed to be turnable around the center shaft 228 extending in the vehicle width direction. Near a rear end portion of the stopping plate 224, one end of the coiled spring 226 is fixed. Near the coiled spring 226, a stopper 227 is placed not to cause turn of the stopping plate 224 in the arrow Q direction beyond the position illustrated in FIG. 8.

The releasing mechanism 230 has a wire 232 which is connected to the cap 100 of the damper 10 and is moved with the movement of the cap 100.

An external force receiving pad 240 receives an external force toward the rear of the vehicle caused by the collision from the rear side of the vehicle or the like. The external force receiving pad 240 is fixed to the turning shaft 242. The turn member 60 of the damper 10 is connected and fixed to the turning shaft 242, and the vessel 20 is supported to be turnable by a fixed axis (not shown in the drawing) at the boss 72 of the cap 70. When an external force toward the rear side of the vehicle is applied to the backrest 204, the external force receiving pad 240 turns around the turning shaft 242 and turns toward the rear side of the vehicle (in the counterclockwise direction) together with the turning shaft 242.

In the case where the load is applied to the backrest 204 at a loading rate within a predetermined turning speed range by seating of a person on the seat cushion 202 of the vehicle seat 200, for example, in the case where ordinary loading toward the rear side of the vehicle by the riding person, or additional loading toward the rear side of the vehicle by the riding person on acceleration of the vehicle, the load is slowly applied to the backrest 204. As the result, the external force receiving pad 204 which has received the load of the riding person turns slowly around the turning shaft 242 which has the external receiving pad 240 fixed thereto. The force of the slow turning of the turning shaft 242 is transmitted to the turn member 60 of the damper 10 connected to the turning shaft 242 to turn the turn member 60 in the counterclockwise direction. With the turn of the turn member 60, the slider member 40 which engages therewith through the slope face 65, 43 of the cylindrical slope portions 66, 44 is moved in the chamber 21 of the vessel 20 against the energizing force of the coiled spring 120.

Since the slider member 40 moves slowly in the chamber 21 of the vessel 20, the viscous fluid V filled in the small room 21b of the vessel 20 flows through the orifice hole 85 of the partition member 80 into the small room 21a with little flow resistance of the viscous fluid V. Therefore, the cap 100 which is engaged with the slider member 40 through the curved plates 47 and the curved plates 103 in the periphery will not be turned, and the vessel 20 fixing the cap 100 will not be turned also. Thus, a pulling force which causes the turn of the stopping plate 224 to release the contact and engage with the end of the energizing plate 214 is not caused in the wire 232 connected to the cap 100, so that the turn of the headrest 206 forward in the P direction is stopped to keep the headrest in the normal position.

On the other hand, when a great acceleration affects the person sitting on the seat cushion 202 by rear end collision, the external force receiving pad 240 is turned instantaneously around the turning shaft 242 supporting the external force receiving pad 240, and the turn member 60 of the damper 10 fixed to the turning shaft 242 is turned instantaneously in the counterclockwise direction. This turn of the turn member 60 tends to move the slider member 40 in the chamber 21 of the vessel 20 against the energizing by the coiled spring 120. However, the viscous fluid V filled in the small room 21b produces strong throttle resistance at the orifice hole 85 of the partition member 80 to connect the turn member 60 with the slider member 40 by rigid coupling. In this state, the turning force given to the turn member 60 turns the slider member 40 rigid-coupled to the turn member 60 together with the cap 100 engaged at the perimeter with the curved plates 47 of the slider member 40 through the curved plates 103.

The turn of the cap 100 pulls downward the wire 232 connected to the cap 100, and turns the stopping plate 224 connected to the wire 232 around the shaft 228 in the direction reverse to the arrow Q. This turn disengages the projection 222 hooking the lower end of the energizing plate 214 from the energizing plate 214 to allow the energizing plate 214 to turn in the arrow P direction by the energizing force of the coiled spring 216. Thereby the headrest 206 is turned in the arrow P direction to hold the head of the riding person (turned to the position indicated by a broken line).

In the above-mentioned vehicle seat 200, the head rest 206, after the turn forward in the P direction, can be restored to engage with the stopping plate 224 at the end of the energizing plate 214 by forcing the headrest 206 to turn the direction reverse to the P direction to engage the end of the energizing plate 214 with the projection 222 of the stopping plate 224.

The recovery of the hooking of the energizing plate 214 by the stopping plate 224 allows the turn of the cap 100 connected to the wire 232 and pulled by the wire 232 connected to the stopping plate 224, and the slider member 40 engaged at the periphery with the curved plates 103 of the cap 100 through the curved plates 47 is displaced by energization by coil spring 120 and turn the turn member 60 engaged with the slider member 40 to restore the slider member 40 and the turn member 60 to the original positions (in the state illustrated in FIG. 4).

The invention claimed is:

1. A damper for damping an external force, comprising:
   a vessel having a cylindrical chamber therein;
   a slider member placed in the chamber, dividing the chamber into a first room and a second room, having a hole connecting between the first room and the second room, and being movable toward both the first room and the second room in the cylindrical chamber;
   a turn member placed in the first room, being turned by the external force, and converting a predetermined direction turning force into a driving force of the slider member;
   a viscous fluid filled in the chamber;
   an elastic partition member engaged with the slider member to open and close the hole by a pressure difference of the viscous fluid between the first room and the second room, having a communication path between the first room and the second room, opening the hole to pour the viscous fluid from the first room to the second room through the hole upon moving of the slider member toward the first room, closing the hole to generate a first throttle resistance or a second throttle resistance larger than the first throttle resistance for limiting a flow of the viscous fluid from the second room to the first room through the communication path upon moving of the slider member toward the second room, and deforming due to a limitation of the flow of the viscous fluid from the second room to the first room while closing the hole;
   a coiled spring that energizes the slider member toward the turn member; and
   a cap fixed to the vessel by engaging with the slider member and blocking an opening at one end of the vessel,
   wherein, when the turn member is turned at a turning rate less than a predetermined turning rate and the elastic partition member closes the hole, the slider member moves at a lower moving rate than a predetermined moving rate toward the second room with damping of the turn of the turn member by the first throttle resistance, and
   when the turn member is turned at a turning rate more than the predetermined turning rate and the elastic partition member closes the hole, a minimum flow passage area of the communication path decreases due to deformation of the elastic partition member, the move of the slider member toward the second room is prevented, and the slider member is rigid-coupled with the turning member to turn together with the turning member by the second throttle resistance larger than the first throttle resistance.

2. The damper according to claim 1, wherein the turn member has a circular cylindrical slope portion having slope faces, the slider member has a circular cylindrical slope portion having slope faces for engaging with the slope faces of the turn member, and the slider member is allowed to move in the cylindrical chamber by turning the turn member engaging the slope faces of the turn member with the slope faces of the slider member.

3. The damper according to claim 1, wherein the slider member has plural curved plates rising along the perimeter at even intervals on a face facing the cap; the cap has plural curved plates rising along the perimeter at even intervals on one face thereof; and the curved plates of the slider member is inserted into the intervals of the curved plates of the cap to engage the slider member with the cap at a periphery direction.

4. The damper according to claim 2, wherein the slider member has plural curved plates rising along the perimeter at even intervals on a face facing the cap; the cap has plural curved plates rising along the perimeter at even intervals on one face thereof; and the curved plates of the slider member is inserted into the intervals of the curved plates of the cap to engage the slider member with the cap at a periphery direction.

* * * * *